United States Patent [19]
Frailey

[11] Patent Number: 5,492,466
[45] Date of Patent: Feb. 20, 1996

[54] VACUUM MOLD AND HEATING DEVICE FOR PROCESSING CONTOURED REPAIR PATCHES

[75] Inventor: James A. Frailey, Fort Worth, Tex.

[73] Assignee: Lockheed Corporation, Fort Worth, Tex.

[21] Appl. No.: 283,837

[22] Filed: Aug. 1, 1994

Related U.S. Application Data

[62] Division of Ser. No. 52,133, Apr. 22, 1993, Pat. No. 5,374,388.

[51] Int. Cl.$^6$ .......................... B29C 43/12; B29C 70/44
[52] U.S. Cl. .......................... 425/389; 156/382; 425/384; 425/405.1
[58] Field of Search .................. 425/389, 405.1, 425/384, 407, 390; 156/382, 94, 285; 264/220, 221, 257, 317, 510, 571; 249/61, 65

[56] References Cited

U.S. PATENT DOCUMENTS

| | | | |
|---|---|---|---|
| 2,287,320 | 6/1942 | Mitchell | 425/389 |
| 2,411,743 | 11/1946 | Morner | 425/389 |
| 2,472,754 | 6/1949 | Mead | 264/220 |
| 3,661,683 | 5/1972 | Engel et al. | 156/94 |
| 4,280,804 | 7/1981 | Holland | 425/389 |
| 4,652,319 | 3/1987 | Hammond | 156/94 |
| 4,698,115 | 10/1987 | Dodds | 156/382 |
| 4,906,425 | 3/1990 | Poussou | 264/227 |
| 5,090,885 | 2/1992 | Stalin | 264/225 |

FOREIGN PATENT DOCUMENTS

| | | | |
|---|---|---|---|
| 2069917A | 9/1981 | United Kingdom | 264/222 |

*Primary Examiner*—Robert B. Davis
*Attorney, Agent, or Firm*—James E. Bradley; Grady K. Bergen

[57] ABSTRACT

An apparatus is provided for molding and curing a curable composite patch used for repairing damaged contoured surface structures. The molding apparatus has a fluid impermeable outer container having a flexible outer wall. A flexible, fluid impermeable inner container containing a moldable granular material is positioned within the outer container and has a flexible molding wall on which the composite patch can be placed. Inner and outer ports are located on the inner and outer containers for evacuating the inner and outer containers. A model of an undamaged surface is formed by positioning the molding wall of the inner container against an unaffected surface and evacuating the inner container so that the granular material is rigidly held in a molded form. The patch is placed on the molding wall and the outer container is sealed with the outer wall positioned over the patch and molding of the inner container. The outer container is then evacuated so that the outer wall is forced against the patch, keeping the patch in a contoured form. The molding apparatus is then placed into a collapsible heating chamber of the invention to cure.

31 Claims, 9 Drawing Sheets

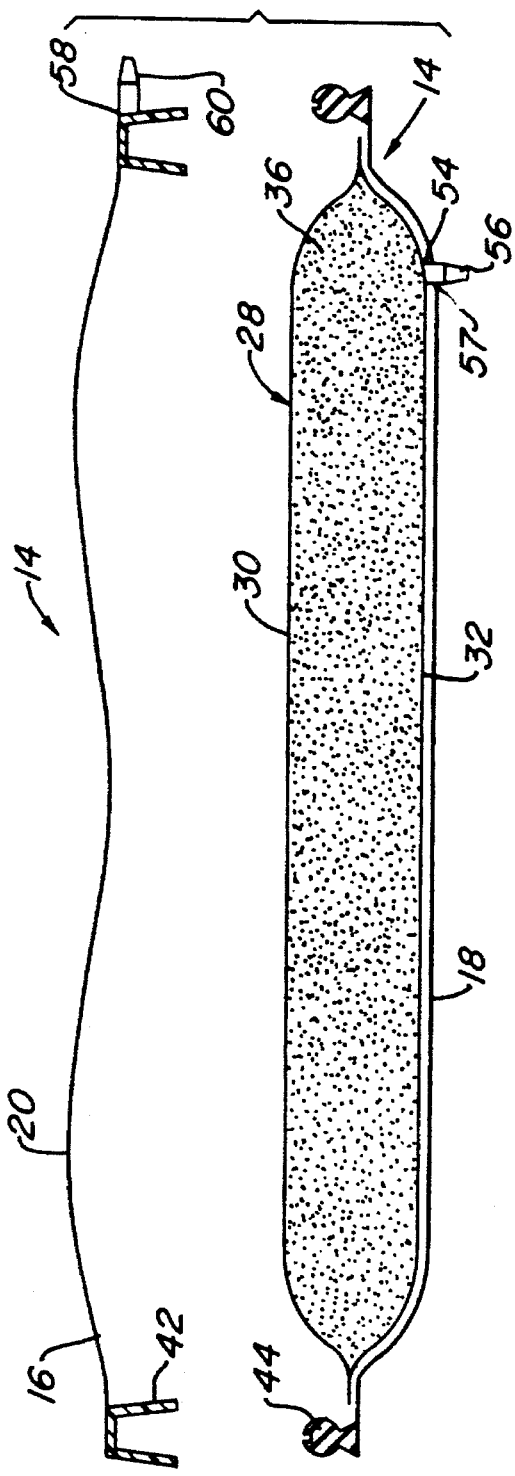
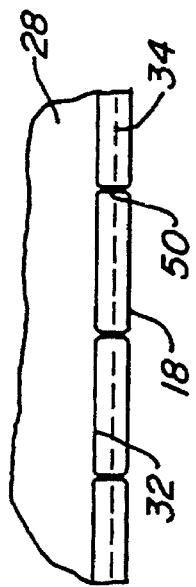

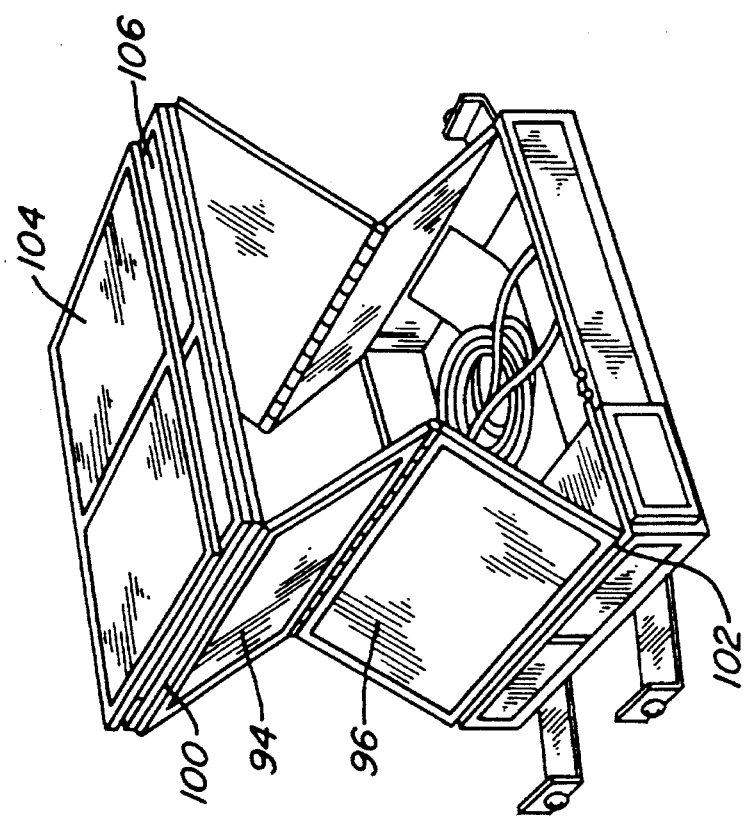
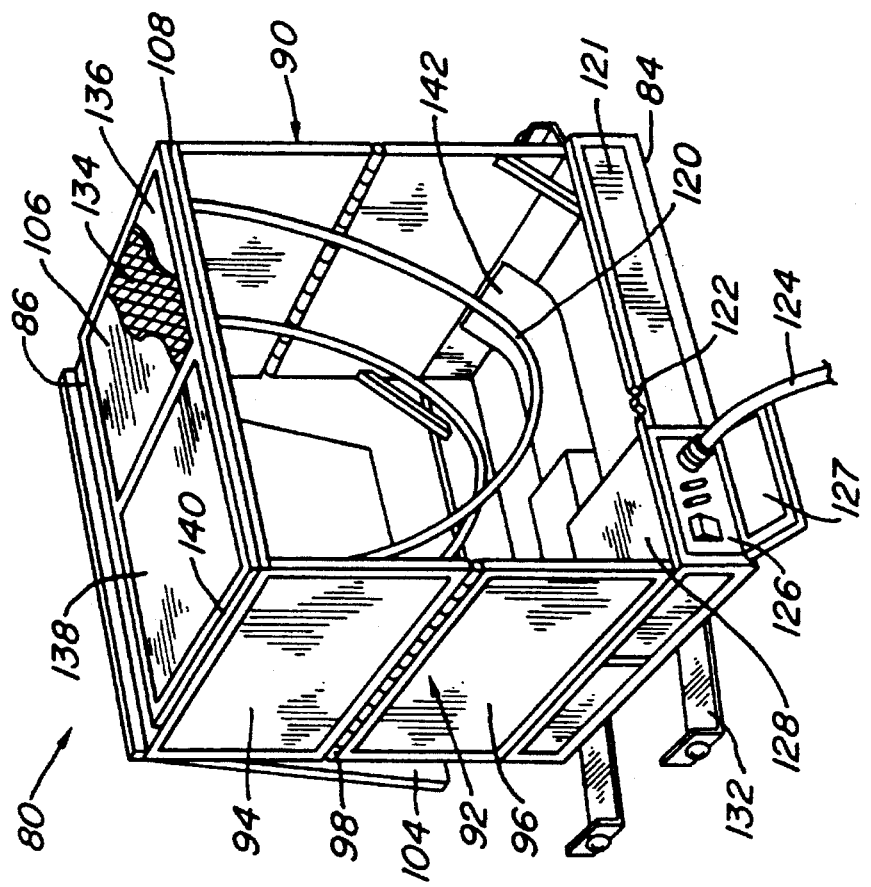

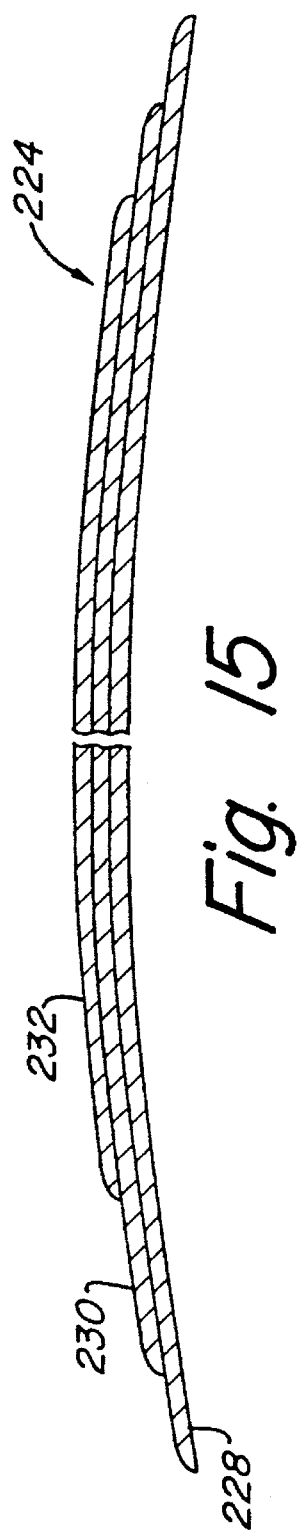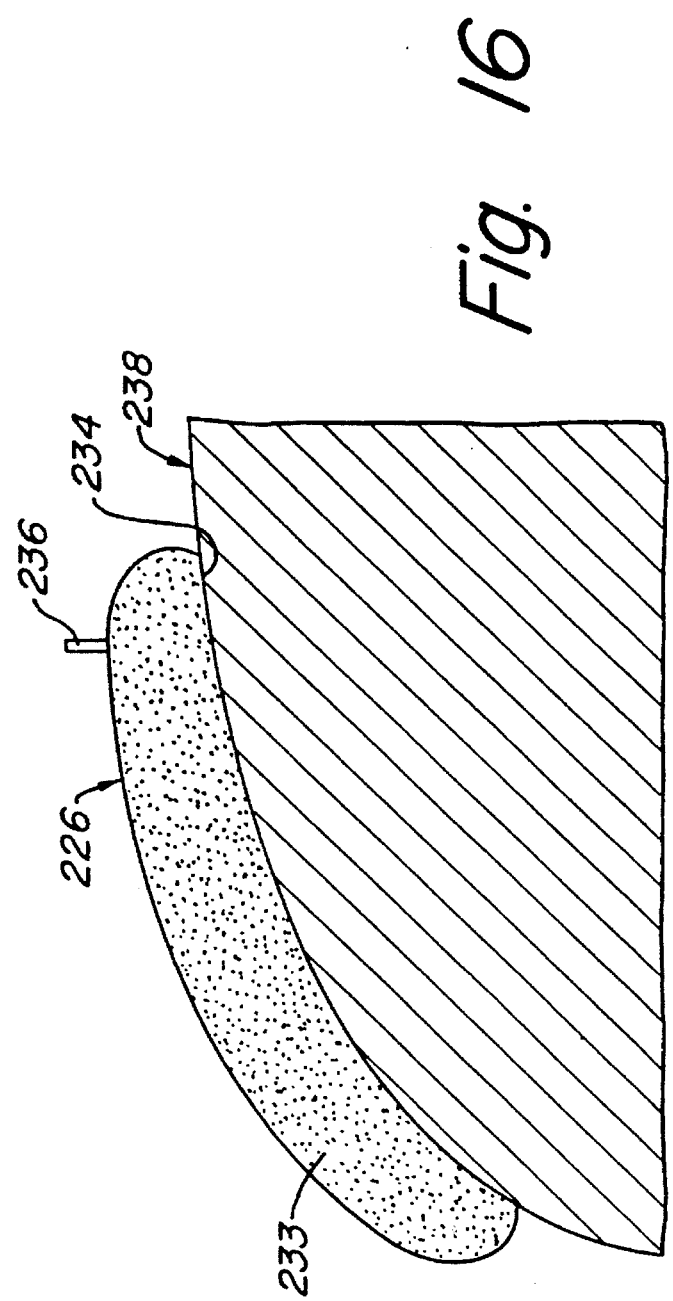

VACUUM MOLD AND HEATING DEVICE FOR PROCESSING CONTOURED REPAIR PATCHES

This invention was made with Government support under Contract Number F33615-91-C-3401 awarded by The Department of the Air Force. The Government has certain rights in this invention. This application is a division of application Ser. No. 08/052,133, filed Apr. 22, 1993, now U.S. Pat. No. 5,374,388.

BACKGROUND OF THE INVENTION

1. Field of the Invention

This invention relates to an apparatus and method for molding and processing a curable composite patch that can be used in the repair of flat or contoured structures, such as the skin of an aircraft, where the patch must conform to the contour of the surface. The patch, once molded and cured, forms a rigid contoured patch that can be positioned over the damaged area.

2. Description of the Prior Art

Methods of repairing damage to surface structures, such as the body of an aircraft, may be accomplished in a variety of ways. Typically the damage is a hole or tear on the surface structure that can be repaired by patching the damaged area.

One method of patching the damaged area is to process a patch directly on the damaged surface structure. This is done by smoothing out the damaged area so there are no jagged edges or protrusions. A thin sheet of backing material is inserted through the hole or tear with the sheet having a larger surface area than the hole. The sheet is usually flexible so that the sheet can be bent when passed through the hole or tear. A paste adhesive is then applied to the sheet and to the back side of the damaged surface. The thin sheet is supported in place against the back side of the damaged surface while the adhesive cures. The hole is then filled by applying paste adhesive to the sheet so that the paste is level with the outer skin surfaces of the damaged structure. An uncured composite patch is then placed over the damaged area. A flexible vacuum bag or cover is positioned over the patch and damaged area, and sealed around the perimeter. By applying a vacuum to the vacuum bag, the vacuum bag is collapsed and forced against the patch and damaged area. Heat is then applied to the patch by applying a heater blanket so that the patch is processed and bonded to the damaged surface at the same time.

Another method involves the use of a second, undamaged surface structure which is used as a tooling mold for fabricating a contoured composite patch. A release film is first placed over the area where the patch is to be made on the undamaged skin of the second structure. This release film is used so that the uncured composite patch will not adhere to the undamaged structure. The uncured composite patch is positioned on the release film and vacuum bagged so that the patch is forced against the undamaged structure. Heat, supplied from a heater blanket, and vacuum pressure are applied to cure the patch while the patch is maintained on the undamaged structure. When the patch is fully cured, the patch is removed and fastened over the damaged area of the original structure.

The heater blankets used in both methods are usually constructed by sandwiching electric heating elements between layers of fiberglass-reinforced silicone rubber sheets. A controller reads the temperature from a thermocouple attached to the heater blanket and adjusts the electrical current to the heater blanket by comparing the temperature at the thermocouple with a preset temperature. If the actual temperature is less (or more) than the set temperature, the current is increased (or reduced) to the heat blanket.

There are several disadvantages to the methods described above for repairing damaged surface structures with composite patches. The first method is difficult to carry out and may result in the backing material not conforming to the skin curvature due to the complex contours of some structures. There may be even more problems in cases where substructure interferences prevent the thin backing sheet from being easily installed.

The second method has the disadvantage of requiring the use of the second, undamaged structure for the period of time that the patch is being processed. This can typically last from one to four hours. The second method also limits the type of resin that can be used on the composite patch to one that can be processed at a temperature of less than 200 degrees fahrenheit. Temperatures in excess of 200 degrees fahrenheit can result in damage to some materials used in aircraft applications. The second method also becomes difficult when the damage is on the bottom or side surfaces of structures where the weight of the patch and heater blankets tend to move the patch from its proper position. Both methods require that seams and holes on the surface structure be sealed in order to apply a vacuum over the area. This is a difficult task, especially for large areas needing repair.

It is often difficult to obtain even temperature distribution using the heater blankets. The surface structure sometimes acts as a heat sink. This can cause a temperature variation of 20 to 30 degrees F. across the repair patch. Because of the construction of the heater blankets, the blankets will not accommodate complex contoured surfaces.

SUMMARY OF THE INVENTION

This invention consists of an apparatus for molding a curable patch used for repairing damaged contoured surface structures. The apparatus has a fluid impermeable outer container formed from a flexible upper portion and a flexible lower portion. The upper and lower portions are joined together by a resealable seal that can be broken to create an opening in the outer container. A flexible outer wall is located on the upper portion of the outer container. A flexible fluid impermeable inner container containing a moldable granular material is positioned within the outer container. An inner port, located on the inner container, has a nozzle which extends through the outer container and is connected to a vacuum hose for evacuating the inner container so that walls of the inner container are drawn against the granular material holding the granular material in a rigid form. The inner container is also provided with a flexible molding wall which can be placed on an unaffected or undamaged contoured surface that is similar to the damaged contoured surface structure.

The molding wall forms a model of the contoured surface so that an uncured composite patch can be molded to the shape of the molding wall. With the patch placed on the molding wall of the inner container, the inner container is sealed inside the outer container. The outer container is provided with a vacuum port with an outer nozzle that is connected to a second vacuum hose for evacuating the outer container. The flexible outer wall is drawn against the patch and molding wall when a vacuum is applied to the outer container. This forces the patch against the molding wall of the inner container so that the patch takes on the shape of the molding wall.

A collapsible heating chamber is also provided for heating the molded patch. The heating chamber consists of a base and a top wall, both having a forward end and a rearward end. Left and right sidewalls join the base and top wall together so that the base and top wall are parallel. Each sidewall includes an upper and lower panel that are joined together by a pivotal intermediate hinge. The upper panel is joined to the top wall by a pivotal upper hinge, and the lower panel is joined to the base by a pivotal lower hinge. This enables a user to pivot the sidewalls to an extended or raised position where the panels of the sidewalls are perpendicular to the base and top wall.

The heating chamber also has a movable back wall and movable front wall that can be positioned between the top wall and base when the heating chamber is deployed, and can be superimposed with the top wall and base when the heating chamber is collapsed. A blower and heating element are provided within the heating chamber to heat the molded patch.

Another embodiment includes a flexible heat cover that is attached to the outer wall of the outer container so that heated air, which is conducted through a heating duct to the heat cover, can be directed over the outer wall thus curing the patch.

BRIEF DESCRIPTION OF THE DRAWINGS

FIG. 2 is a cross-sectional view of the invention of FIG. 1 taken along the lines II—II.

FIG. 3 is a cross-sectional view of the seal of the invention shown in the sealed position.

FIG. 4 is a cross-sectional view of the lower portion of the outer container and the base wall of the inner container of the invention of FIG. 1.

FIG. 5 is a perspective view of the heating chamber constructed in accordance with this invention.

FIG. 6 is a perspective view of the heating chamber of FIG. 5 shown partially collapsed.

FIG. 15 is a cross-sectional view of an alternate embodiment of a composite patch which has tapered edges.

FIG. 16 is a cross-sectional view of another embodiment of the invention showing a container with a female molding wall conformed to an unaffected surface and for use in constructing the patch of FIG. 15.

DETAILED DESCRIPTION OF THE INVENTION

Figure 1:
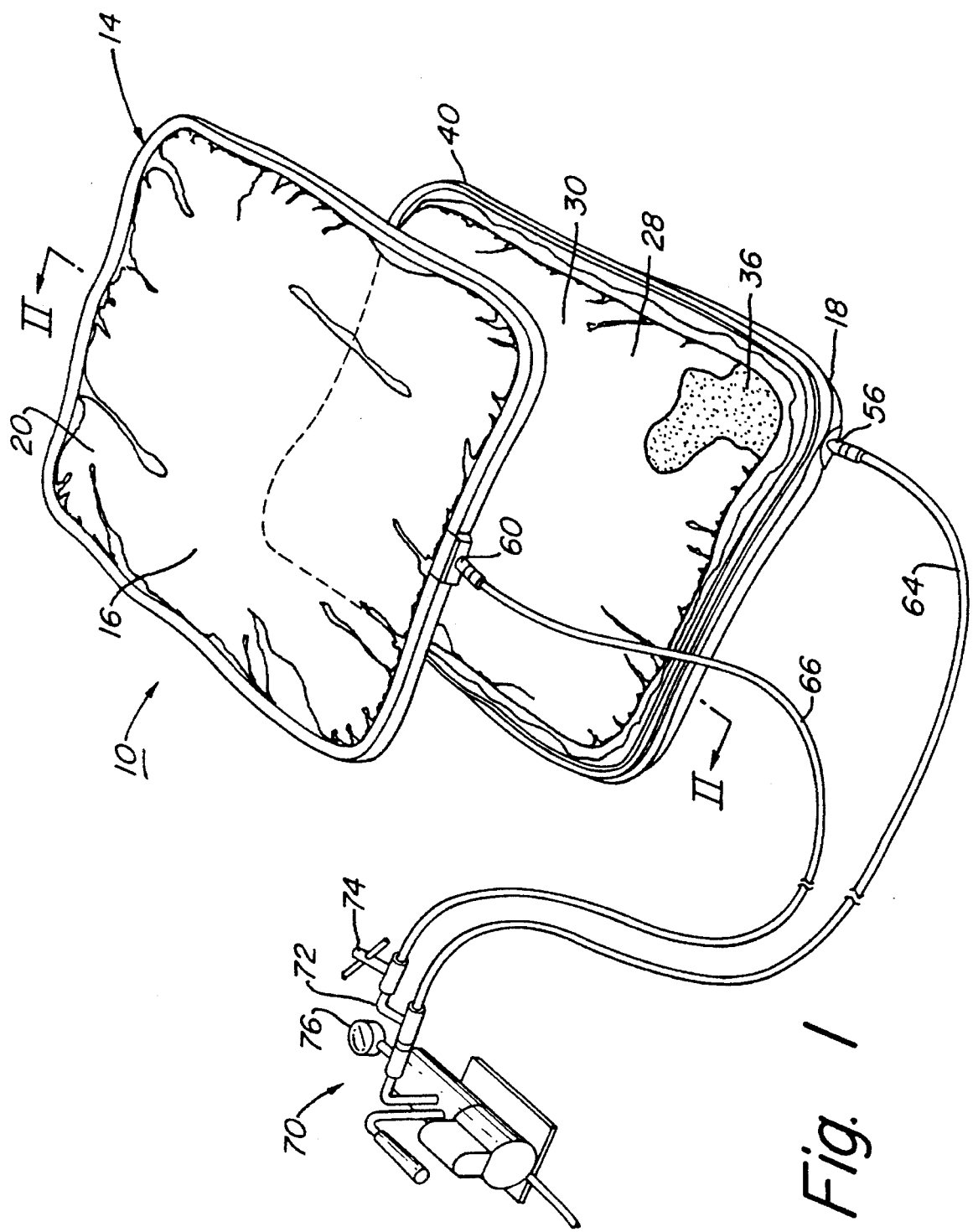
FIG. 1 is a perspective view of the tooling mold apparatus for molding a curable composite patch constructed in accordance with this invention.

As shown in FIG. 1, the invention consists of a tooling mold apparatus 10. The mold apparatus 10 has a flexible outer container 14 made of a flexible, fluid impermeable material, preferably silicone rubber. The outer container 14 is divided into a flexible upper portion 16 and a flexible lower portion 18. A flexible outer wall 20 is located on the upper portion 16 and is made of silicone rubber.

The mold apparatus 10 also has a thin, flexible, fluid impermeable inner container 28 with a flexible molding wall 30 and a flexible base wall 32 (FIG. 2). The inner container 28 has dimensions that allow the inner container 28 to be located and contained completely within the outer container 14. The base wall 32 of the inner container 28 is oriented so that the base wall 32 faces the lower portion 18 of the outer container 14. A breather cloth 34 (FIG. 4) locates between the base wall 32 of the inner container 28 and the lower portion 18 of the outer container 14. This allows air to be drawn from between the base wall 32 and the lower portion 18 of the outer container 14.

The inner container 28 contains a moldable granular material 36. The granular material 36 can be aluminum silicate powder such as the aluminum silicate marketed under the name Perlite King Grade IN-8, available from Filter Media Co., P.O. Box 19156, Houston, Tex. 77224-9156. Sand could also be used, however, aluminum silicate powder is preferable because of its light weight.

The inner container 28 is formed of silicone rubber having a thickness of approximately 0.03 inches. Both the inner container 28 and the outer container 14 should be formed of materials that can withstand fairly high temperatures up to 350 degrees Fahrenheit.

A silicone rubber seal 40 is located along the perimeter of the upper and lower portions 16, 18 of the outer container 14. The seal 40 is a fluid impermeable seal which allows the upper and lower portions 16, 18 to be sealed together with the inner container 28 located inside the outer container 14. Seal 40 (FIG. 3) consists of a C-channel portion 42 located on the periphery of the upper portion 16. A rib portion 44 is located on the periphery of the lower portion 18 of the outer container 14. The C-channel 42 fits over the rib 44, as shown in FIG. 3, to seal the upper and lower portions 16, 18 together. The seal 40 allows the upper portion 16 to be completely removed from the lower portion 18 so that a curable patch can be placed on the molding wall 30 of the inner container 28 when positioned within the outer container 14.

As seen in FIG. 2, the inner container 28 is positioned in the lower portion 18 of the outer container 14. FIG. 4 shows attachment points 50 between the inner surface of the lower portion 18 of the outer container 14 and the base wall 32 so that the inner container 28 can not be removed from the lower portion 18. The attachment points 50 may be spot glued or formed by other conventional methods.

An inner vacuum port 54 is located on the base wall 32 of the inner container 28. The inner port 54 has an inner nozzle 56 which extends through a port 57 located in the lower portion 18 of the outer container 14. The port 57 is sealed around the inner nozzle 56 so that air will not leak into the outer container 14 when the outer container 14 is under a vacuum.

An outer vacuum port 58 is located on the outer container 14. As can be seen in FIG. 2, this port 58 may be located on the C-channel 42 of the upper portion 16. An outer nozzle 60 extends from the vacuum port 58.

A first vacuum hose 64 is attached to the inner nozzle 56 for evacuating the inner container 28. A second vacuum hose 66 is attached to the outer nozzle 60 to evacuate the outer container 14. Vacuum hoses 64, 66 are attached to a vacuum pump 70 as shown in FIG. 1. The vacuum pump 70 should be provided with a means for selectively providing vacuum to the outer container 28 while the inner container 14 is under a vacuum. This can be accomplished by providing a separate intake 72 with a manual valve 74 that can be opened to supply a vacuum to the outer container 14. The vacuum pump 70 may also be provided with a pressure gauge 76 to indicate when a full vacuum has been achieved. The vacuum pump 70 should be able to create a vacuum of at least 29 inches of Mercury, and the granular material 36 should not deform under the vacuum pressure.

The composite patch 78 (FIG. 11) used may be either a graphite or fiberglass fabric having a post cured thickness of 0.12 to 0.25 inches. The patch may be pre-impregnated with epoxy or resin, or may be formed in a wet layup process. Patches formed in the wet layup process usually consist of mixing two components of epoxy or resin together and working the epoxy or resin into the fabric. The wet patch is then molded as described below. Pre-impregnated cloth takes approximately two hours at 350 degrees F. to cure. The wet layup fabric is preferable because the patch only needs to be heated for thirty minutes at 200 degrees Fahrenheit. Such a two component epoxy system, described as EA9396, is available from Hysol Aerospace Products, 2850 Willow Pass Road, P.O. Box 312, Pittsburgh, Calif. 94565.

FIG. 5 shows an oven 80 used for curing the composite patch used in this invention. The oven 80 is a convection type oven that can be deployed from a compact configuration shown in FIG. 7. The oven 80 consists of a base 84 having a forward and rearward end. A top wall 86, also having a forward and rearward end and having substantially the same dimensions as the base 84, is joined to left and right sidewalls 90, 92 that connect the base 84 and top wall 86 together so that the base 84 and top wall 86 are parallel to each other. Each sidewall 90, 92 includes an upper panel 94 and an lower panel 96. Panels 94, 96 are joined together by a pivotal intermediate hinge 98. The upper panel 94 is joined to the top wall 86 by a pivotal upper hinge 100, and the lower panel 96 is joined to the base 84 by a pivotal lower hinge 102. This allows the panels 94, 96 of each sidewall 90, 92 to be pivoted inward from an extended position to a folded position. In the extended or raised position (FIG. 5), the panels 90, 92 are perpendicular to the base 84 and top wall 86. In the folded position (FIG. 7), the panels 90, 92 are parallel to the base 84 and top wall 86.

Figure 7:
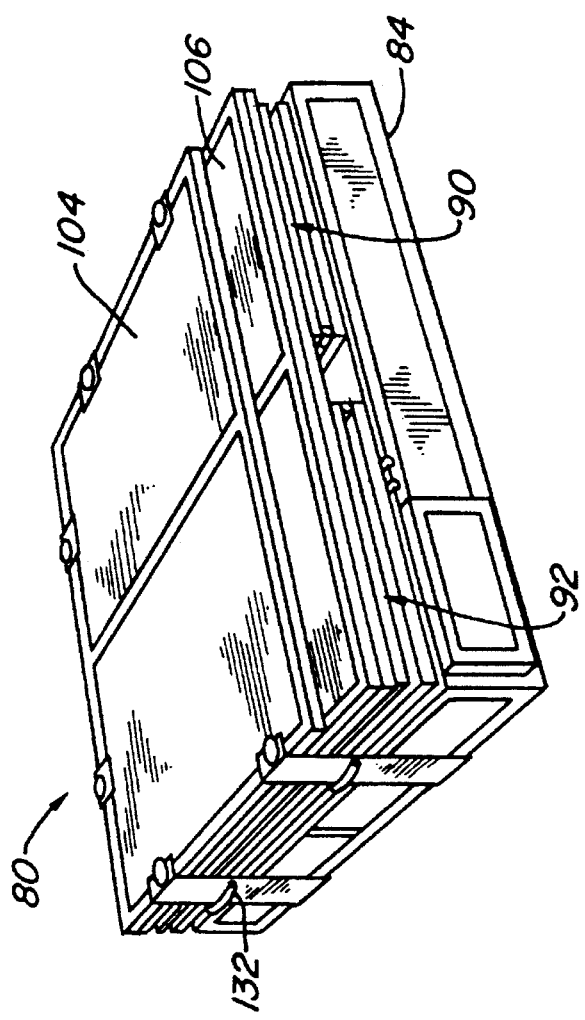
FIG. 7 is a perspective view of the heating chamber of FIG. 5 in a completely collapsed position.

A movable back wall 104 is attached to the rearward end of the top wall 86. The back wall 104 is pivotally mounted to the top wall 86 by a hinge (not shown) to the rearward end of the top wall 86 and locks by conventional means to the rearward end of the base 84. A movable front wall 106 is attached to the forward end of the top wall 86 by a hinge 108 and locks to the forward end of the base 84 by conventional means. Both the back and front walls 104, 106 can be unlocked and pivoted so that they are in a superimposed position with the top wall 86 and base 84 when the oven 80 is collapsed, as shown in FIG. 7. The back and front wall 104, 106 rest flat on the top wall 86 when the oven 80 is collapsed.

Figure 8:
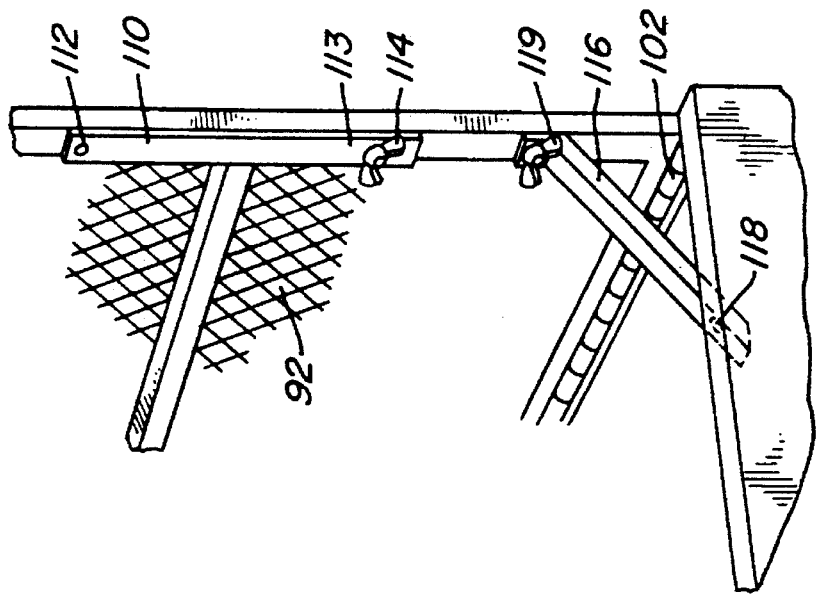
FIG. 8 is a perspective view of a portion of the sidewalls and a portion of the base of the heating chamber of FIG. 5.

FIG. 8 shows the sidewall 92 in an extended position. Each sidewall 90, 92 is kept in the extended position by a sidewall brace 110 which is attached to the upper panel 94 by a pivot pin 112. This allows the sidewall brace to be pivoted to a position where the brace 110 spans the intermediate hinge 98 to the lower panel 96. The free end of the brace 110 is then secured to the lower panel 96 by a removable, studded wing-nut 114 which screws into a threaded hole in the lower panel 96. When the brace 110 is secured, the upper and lower panels 94, 96 will be parallel to each other. A lower sidewall brace 116 is attached at one end to a pivot pin 118 located on the base 84. The lower brace 116 extends to the lower panel 96 spanning the lower hinge 102. The free end of the lower brace 116 is secured to the lower panel 96 by a removable, studded wing-nut 119 which screws into a threaded hole in the lower panel 96. A lower brace 116 is installed in each corner of the oven 80 except for the left-front corner. The back and front walls 104, 106 also stabilize the oven 80 when in the raised position.

Flexible straps 120 are attached to the upper portion of the interior of oven 80. The straps 120 are used for holding the molding apparatus 10 when placed inside the oven 80. Straps 120 should extend far enough into the oven 80 so that the molding apparatus 10 can be placed within the oven 80 without touching the base 84 or sidewalls 90, 92. The straps 120 are made of a high temperature cloth. The straps 120 should be removable and removed each time the oven 80 is collapsed.

FIG. 5 shows the base 84 may be provided with base panels 121 which extend perpendicularly from the base 84. The base panels 121 extend around the perimeter of the base 84. Slots 122 can be provided in the base panel 121 for the vacuum hoses 64, 66 of the mold apparatus 10. A power source 124 can be attached to a control panel 126 which is located on the left-front portion of the base panel 121. A control panel cover 127 hinges to the bottom of the base panel 121 to protect the components of the control panel 126.

Oven 80 is also provided with a housing 128 containing a controller and blower motor (not shown) located in the left-front corner of the oven 80. The controller and blower motor are ventilated to ambient air. A low profile air heater (not shown) having a blower and electrical heating elements (not shown) are located behind the housing 128.

Closure latches 132 can be joined to the base 84 for holding the oven 80 in the collapsed position. Closure latches 132 are pivotally mounted to the base 84 so that when the sidewalls 90, 92 are collapsed and the rear and front walls 104, 106 are resting on the top wall 86, the closure latches 132 can be extended over the back and front walls 104, 106, thereby holding the walls 104, 106 in place and retaining the oven 80 in the collapsed position.

The sidewalls 90, 92, base 84 and walls 86, 104, 106 may be constructed of a pressed fiberglass insulating material having an aluminum foil backing. The fiberglass material 134 having a thickness of approximately one inch is sandwiched between an inner and outer aluminum covering 136, 138 with the foil backing facing inward. The aluminum coverings 136, 138 are flat, and may be constructed of thin aluminum sheets. A frame 140 surrounding the aluminum and fiberglass material provides strength and stability. The frame 140 should be made of a low heat conducting material.

The oven 80 can also be provided with a heat deflector 142 for directing heated air from the blower (not shown). This causes the heated air to circulate in the oven so that the molding apparatus 10 is heated more uniformly. The oven should be able to operate at temperatures up to 400 degrees F. The control panel 126, controller, blower motor and air heater are of conventional design and therefore not discussed in detail.

Figure 10:
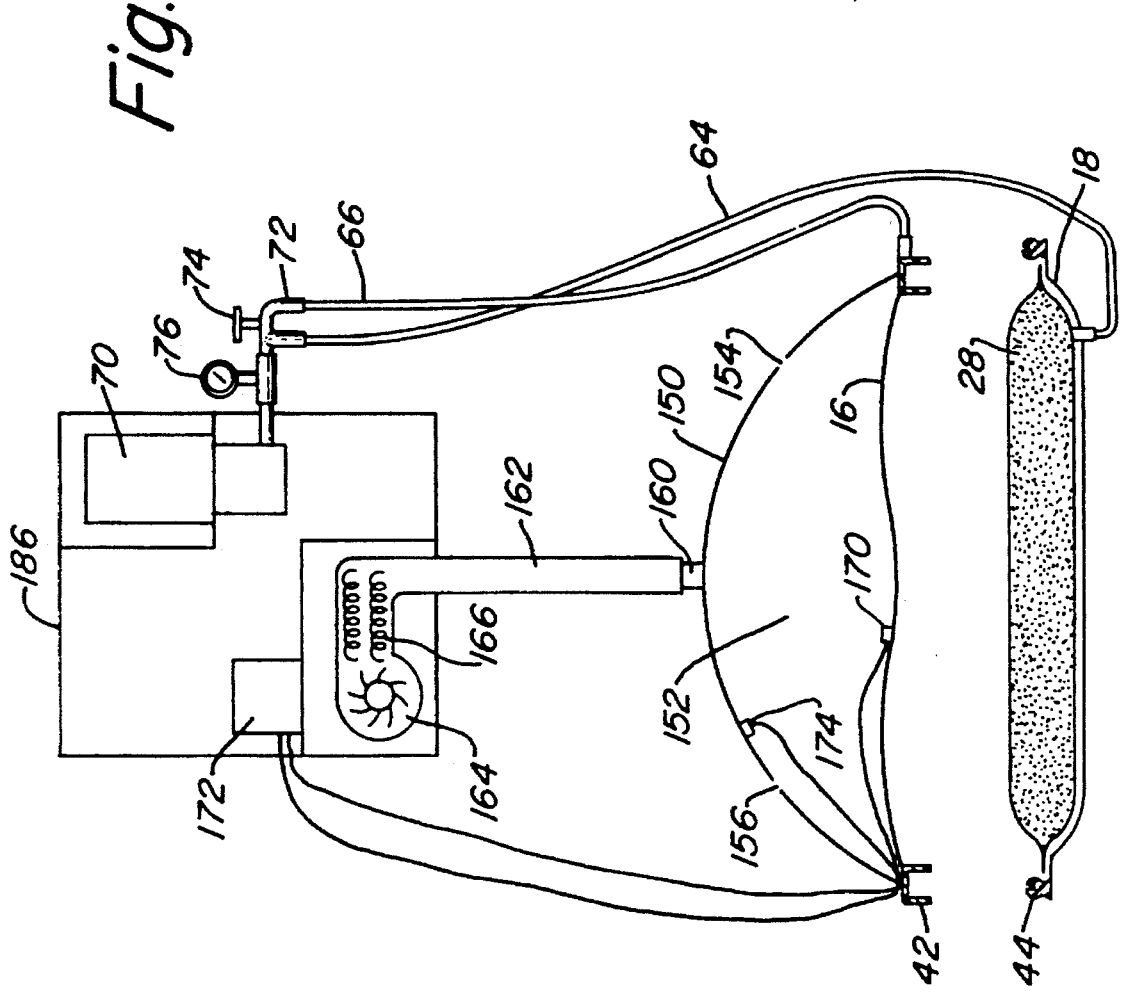
FIG. 10 is a perspective view of an unaffected surface structure used in the preparation of the composite patch with the apparatus of the invention.

A repair patch is prepared in the following manner. First, the unaffected surface structure which is to be used to form a model of the affected surface is prepared. FIG. 10 shows an unaffected area 200 of a area to be used to mold the inner container 28 of the mold apparatus 10. The unaffected area is marked with an outline of the damaged area 202. A spacer sheet 204 having the larger dimensions and the same thickness as the patch 78 is placed over the outline of the damaged area 202. The spacer sheet 204 is preferably silicone foam rubber. Grommets or locator pins 205 may also be taped to the unaffected area 200 in order to define the area on which the patch 78 is to be placed. The grommets 205 should be placed approximately 3 to 4 inches away from the spacer sheet 204.

To form a model of the unaffected surface 200, the upper portion 16 of the outer container 14 is separated and removed from the lower portion 18 by breaking the seal 40 along the perimeter of the upper portion 16. With the upper portion 16 removed, the inner container 28, which is located within the lower portion 18 of the outer container 14, is positioned over the unaffected area 200. At this point, the inner container 28 has not been evacuated. This allows the inner container 28 containing the granular material 36 to conform easily to the contour of the unaffected area 200. The spacer sheet 204 will form a depression 208 in the molding wall 30 of the inner container 28, and the grommets 205 will also form small depressions 210 in the molding wall 30. Because the inner container 28 is relatively thin, the base wall 32 will deform in an opposite contour to the molding wall 30.

With the inner container 28 positioned on the unaffected surface 200, the vacuum pump 70 is switched on with valve 74 closed. This causes a vacuum to be pulled through hose 64 to the inner container 28 and prevents air from being drawn through the vacuum hose 66 connected to the outer container 14. This causes the inner container 28 to be evacuated so that the molding wall 30 and base wall 32 of the inner container 28 are drawn against the granular material 36. The force applied to the granular material 36 by the walls 30, 32 prevents relative movement of the particles of the granular material 36 so that the molding wall 30 of the inner container 28 forms a rigid model of the unaffected surface 200. It is important that the vacuum is maintained on the inner container 28 during the complete molding and curing process so that the inner container 28 will not lose its molded form.

When the model of the contoured surface 200 is achieved, the inner container 28 is removed from the unaffected surface 200 and positioned so that the molding wall 30 faces upward. A release agent, such as silicone, may be applied to surfaces of the inner container 28 and outer container 14 prior to the molding process to prevent the surfaces from adhering to the patch. If silicone rubber is used for the construction of the outer container 14 and inner container 28, it may not be necessary to coat the surfaces with a release agent since silicone rubber acts as a natural release agent.

Figure 11:
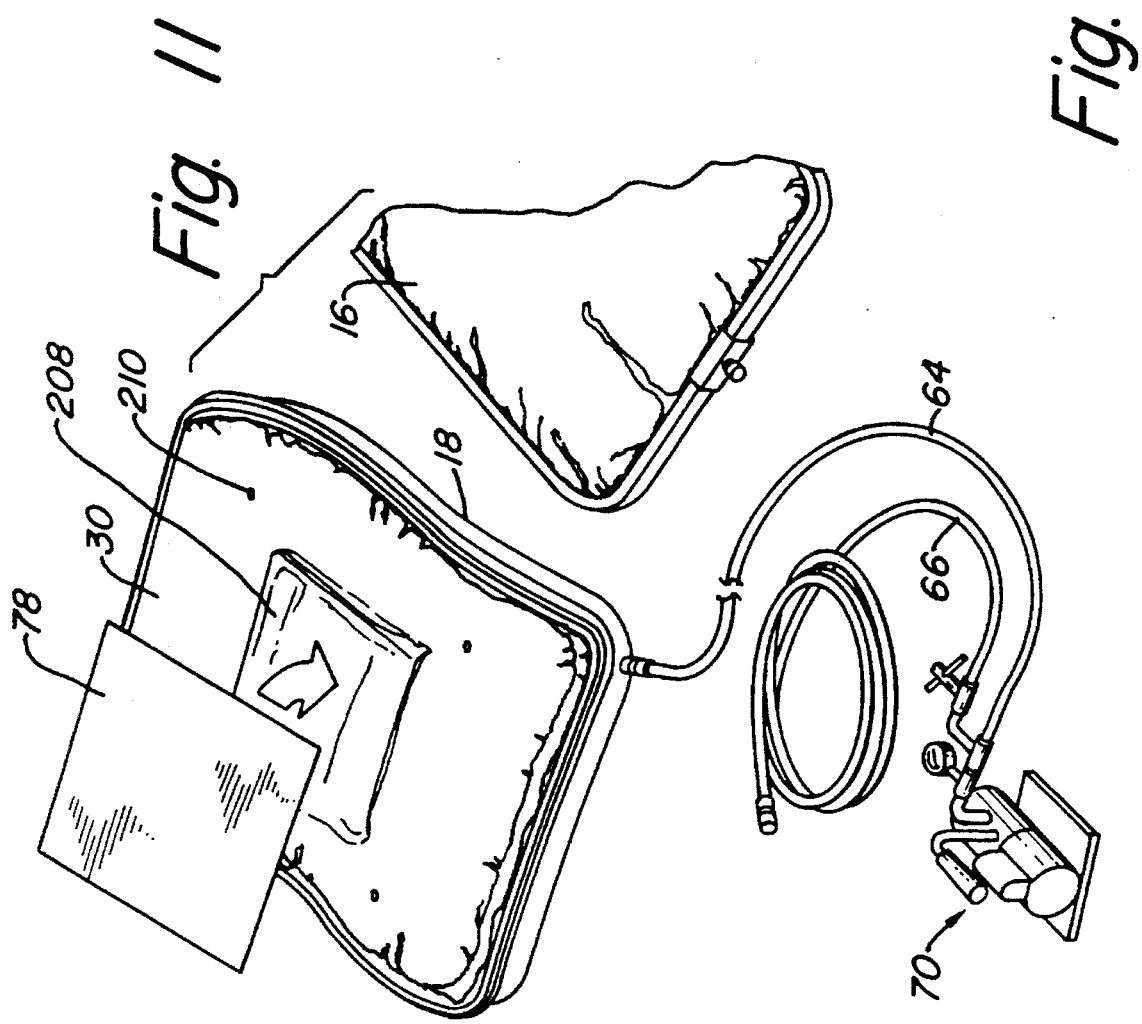
FIG. 11 is a perspective view of the apparatus of FIG. 1 prior to placing an uncured patch on the molding wall.

With the inner container 28 removed from the unaffected surface 200, the molding wall 30 will have the same contour as the unaffected area 200, as shown in FIG. 11. The spacer sheet depression 208 and grommet holes 210 will also be formed in the molding wall 30. The patch 78 is then placed on the depression 208 of the contoured molding wall 30. The grommet holes 210 indicate the position where the patch 78 should be placed. A perforated release film and breather cloth (not shown) are placed above the patch 78.

The upper portion 16 of the outer container 14 is then sealed to the lower portion 18. This is done by positioning the C-channel 42 over the rib 44 so that the rib 44 engages the C-channel 42 as shown in FIG. 3. When the upper portion 16 is sealed, the valve 74 is opened allowing air to be drawn from the outer container 14. The breather cloth (not shown) above the patch 78 and the breather cloth 34 between the base wall 32 and the lower portion 18 of the outer container, allow vacuum pressure to exist over the entire surface of the inner container 28. Because the outer container 14 is made of a flexible material, the outer wall 20 is drawn against the patch 78 and molding wall 30 without being stretched or distorted.

The oven 80 is assembled or deployed from the position shown in FIG. 7 by pivoting the latches 132 so that they are not engaged with the walls 104, 106. The sidewalls 90, 92 are then extended and each sidewall brace 110 is pivoted so that it extends over the intermediate hinge 98 and is attached by the wing-nut 114 on the lower panel 96. Each lower sidewall brace 116 is also pivoted so that it extends across the lower hinge 102 and is secured by wing-nut 114 to the lower panel 96. This is done for each sidewall 90, 92 so that the sidewalls 90, 92 are held in a rigid perpendicular position to the base 84 and top wall 86. The back wall 104 is then rotated so that it is perpendicular to the base 84 and locked into place.

Figure 12:
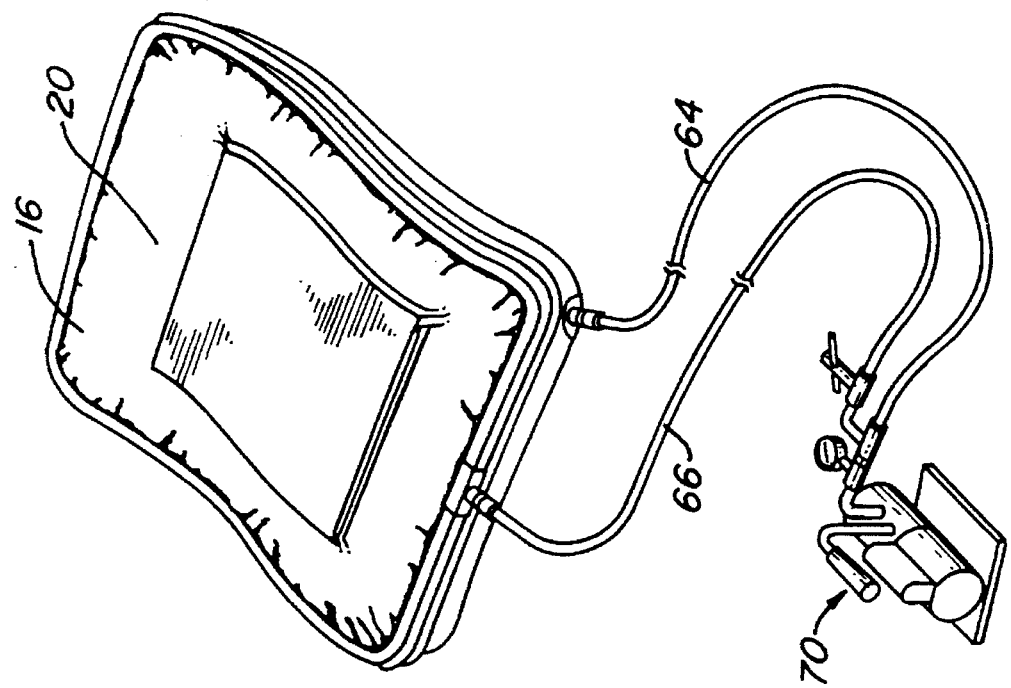
FIG. 12 is a perspective view of the patch being molded on the apparatus of FIG. 1.
Figure 13:
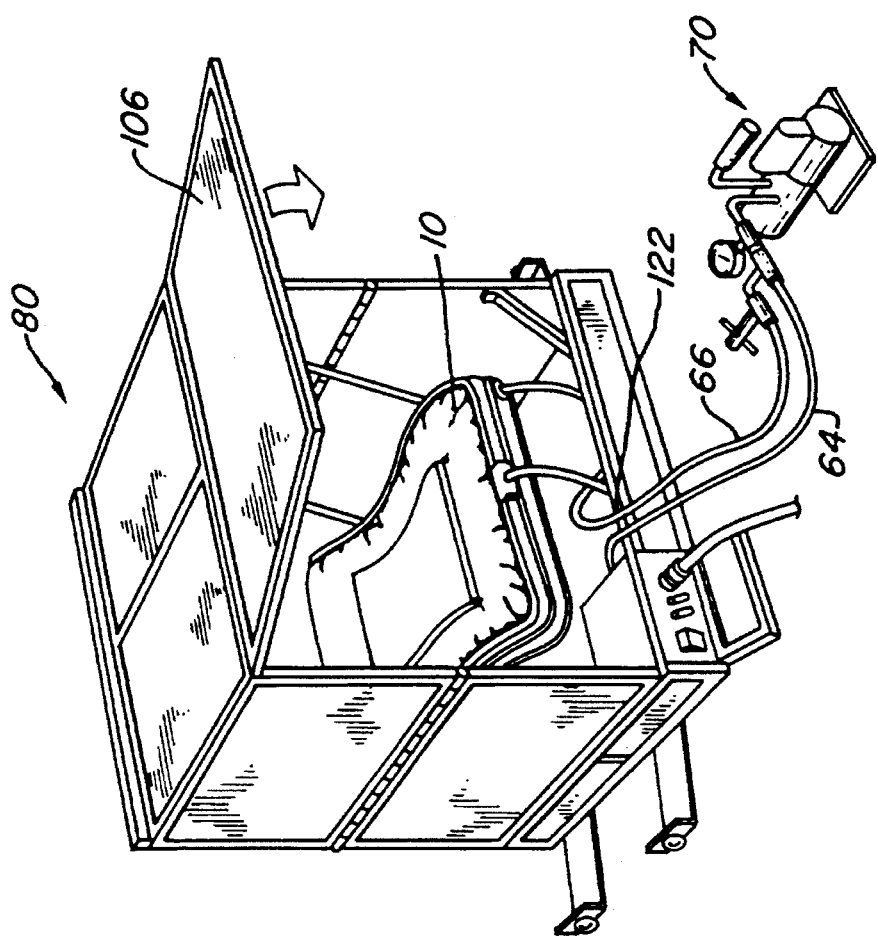
FIG. 13 is a perspective view of the molding apparatus of FIG. 1 positioned within the heating chamber of FIG. 5, prior to curing the patch.

With both the inner container 28 and outer container 14 still under vacuum, the mold apparatus 10 with the patch 78 (FIG. 12) is placed within the oven 80 (FIG. 13) without touching the sidewalls 90, 92 or base 84 by placing the apparatus 10 on the flexible straps 120. The vacuum hoses 64, 66 are positioned within the slots 122. The front wall 106 is then lowered to a perpendicular position with the base 84 and locked into place. The oven 80 is then heated to a selected temperature and the patch 78 is allowed to cure.

Figure 14:
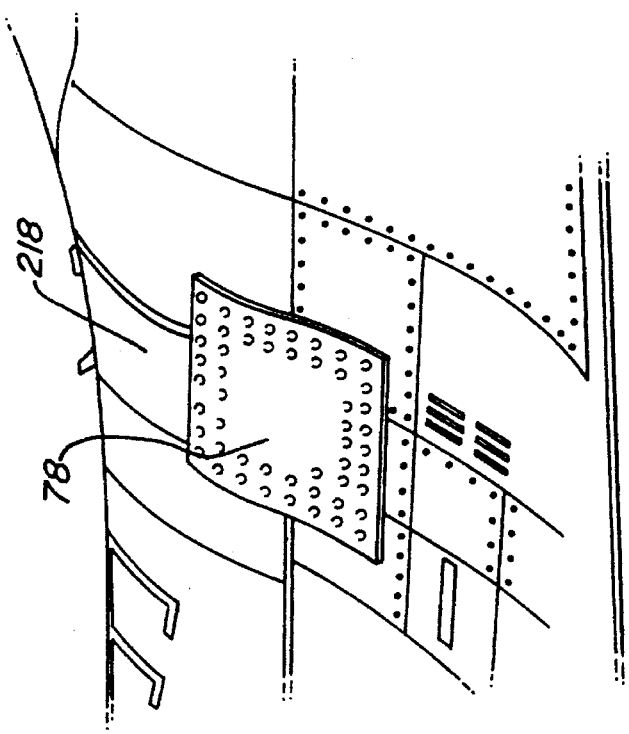
FIG. 14 is a perspective view of the patch as shown attached to the damaged structure.

After the patch 78 is cured, the mold apparatus 10 is removed from the oven 80 and the upper portion 16 is unsealed from the lower portion 18. The molded patch 78 can then be removed and secured to the damaged surface 218 by fasteners or rivets, as shown in FIG. 14. Prior to placing the molded patch 78 on the damaged surface 218, it may be necessary to first prepare the damaged area 218 by smoothing out all jagged edges or protrusions over which the patch 78 is to be placed.

Figure 9:
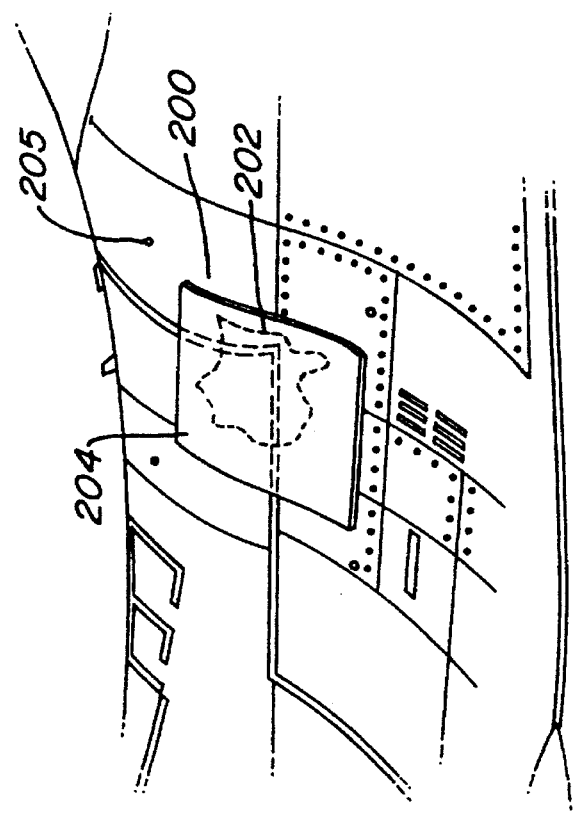
FIG. 9 is cross-sectional view of another embodiment of the apparatus of FIG. 1 with a heat cover.

In another embodiment, the molding apparatus 10 can be combined with a heat cover 150 as shown in FIG. 9. The heat cover 150 is formed from a flexible material, preferably silicone rubber. The perimeter of the heat cover 150 is joined to the outer wall 20 or upper portion 16 of the outer container 14 so that a cavity 152 exists between the outer wall 20 and inside of the heat cover 150. The heat cover 150 is provided with vents 154, 156 for ventilating heated air introduced into the cavity 152. A port 160 is attached to an air hose 162 for conducting heated air into the cavity 152 from a blower 164.

The blower 164 blows air through electrical heating elements or coils 166 and through the air hose 162 to the port 160 in the heat cover 150. The blower 164 should have a high enough capacity so that the pressure within the cavity 152 is one to two p.s.i. above atmospheric pressure. The heated air is introduced into the cavity 152 and exhausted through vents 154, 156 to the atmosphere. A thermocouple 170 is located on the flexible molding wall 30 of the inner container adjacent to the molded patch 78. The thermocouple 170 is connected to a controller 172. A pressure transducer 174 is also located on the surface of the heat cover 150 and is connected to the controller 172. The controller 172 responds to signals from the thermocouple 170 and pressure transducer 174 to adjust the electrical current to the blower 164 and heating elements 166 so that the temperature and pressure within the cavity 152 are maintained at preselected values enabling the molded patch 78 to be cured. The controller 172, blower 164 and heating elements 166 are of conventional design. A housing unit 186 is provided to house the controller 172, blower 164 and heating elements 166. The vacuum pump 70 can also be located within the housing 186. In the alternate embodiment of FIG. 9, the patch 78 is molded as described above, but the heating step is accomplished by using the blower 164, which blows air through the air hose 162. The heated air heats the surface of the outer container 14, thus curing the patch 78. The controller 172 compares input from the pressure transducer 174 and thermocouple 170 to a preselected pressure and temperature. The controller 172 then adjusts the electrical current to the blower 164 and heating element 162 so that the preselected temperature and pressure are maintained within the cavity 152.

Figure 17:
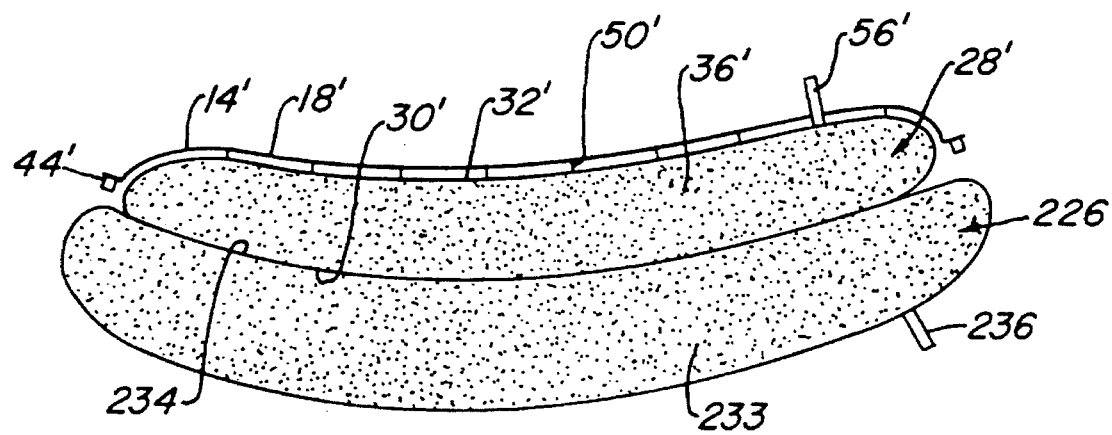
FIG. 17 is a cross-sectional view of the container of FIG. 16 with a second container having a male molding wall molded to the female molding wall.
Figure 18:
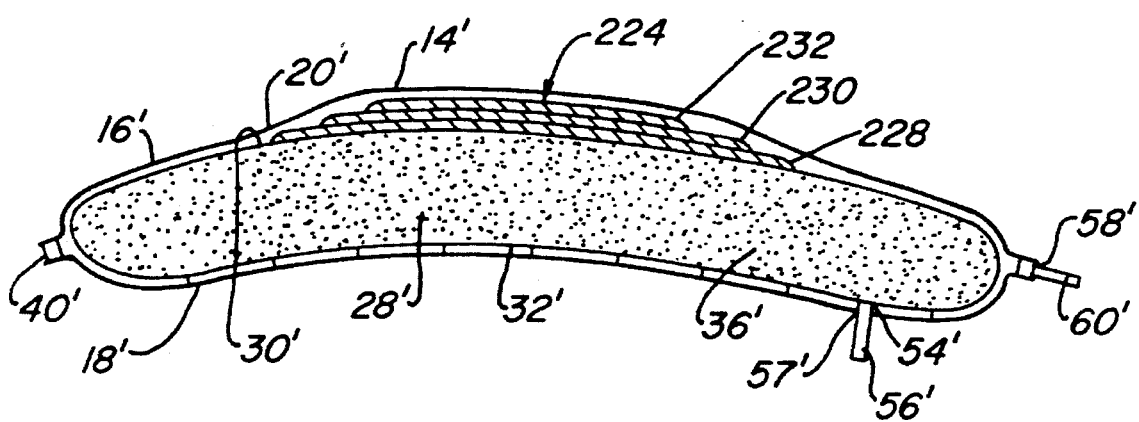
FIG. 18 is a cross-sectional view of the tapered patch of FIG. 15 positioned on the male molding wall of the second container of FIG. 17.

In still another embodiment, a composite patch 224 (FIG. 15) having a tapered thickness can be molded into a contoured form by using a separate fluid impermeable container 226 (FIG. 16) in combination with a fluid impermeable container 28' (FIG. 17) and a fluid impermeable outer container 14' (FIG. 18).

The composite patch 224 is similar to the patch 78 in FIG. 11, but the patch 224 is made from several layers 228, 230, 232. The bottom or lower layer 228 has surface dimensions that are greater than the layers 230, 232. Layer 230 has greater surface dimensions than the upper layer 232. This causes the patch 224 to have a gradually tapered thickness which is greater at the center than at the perimeter.

The container 226 is similar to inner container 28 and container 28' and is filled with a moldable granular material 233. The container 226 has a flexible female molding wall 234 and a nozzle 236 for evacuating the container 226.

Container 28' and outer container 14' are of the same construction as inner container 28 and outer container 14, respectively, of mold apparatus 10 in FIG. 1. Similar components are designated by the corresponding numeral with a prime symbol.

In order to mold the tapered patch 224, the female molding wall 234 of the container 226 is first positioned on an unaffected contoured surface 238 which is equivalent to the damaged structure which is to be repaired. The granular material 233 inside the container 226 will conform to the unaffected surface 238. A conventional vacuum source (not shown) attached to the nozzle 236 reduces pressure in the container 226 so that female molding wall 234 is drawn against and conforms to the granular material 233. The female molding wall 234 thus forms a rigid female form of the unaffected surface 238. The container 226 is then removed from the unaffected surface 238.

The female molding wall 234 is then used to mold the container 28'. This is accomplished by positioning a male molding wall 30' of the container 28' on the female molding wall 234, as shown in FIG. 17, prior to evacuating the container 28'. The granular material 36 will conform to the shape of the female molding wall 234, and the pressure in the container 28' can be reduced so that the male molding wall 30' conforms to the granular material 36'. This causes the male molding wall 30' of the container 28' to take on a corresponding male form of the female molding wall 234.

The uncured patch 224 is then placed on the container 28' with the lower layer 228 against the male molding wall 30'. The container 28' with the patch 224 is then positioned within the outer container 14' and the outer container is sealed by closing seal 40' as shown in FIG. 18. When seal 40' is closed, the outer wall 20' will be positioned over the male molding wall 30' and the patch 224.

The pressure in outer container 14' is then reduced so that the outer wall 20' is drawn against the male molding wall 30' and the patch 224, causing the patch 224 to assume the shape of the male molding wall 30'.

While the uncured patch 224 is forced against the molding wall 30' the patch 224 is then cured by heating the patch 224 inside an oven, such as the oven 80 described above. After the patch 224 is cured, the patch 224 may then be removed and used to patch the damaged structure.

The above-described molding apparatus is an improvement over prior art methods of forming contoured patches. The molding apparatus is re-usable and can be used for different types of contoured surfaces. The molding apparatus can be quickly conformed to the surface of an undamaged structure and removed, thereby freeing up the undamaged structure. This also allows higher temperatures to be used in curing the composite patch that might otherwise damage or fatigue the undamaged structure. Because of the light weight of the mold apparatus, the mold apparatus can be applied to almost any area where it would be difficult to form a patch using heater blankets. There is no need to seal seams and fastener holes on the damaged or undamaged structure since no vacuum is drawn on these structures.

The oven and heat cover provide a more consistent and even temperature distribution than in prior art methods. Since both are operated independent from the unaffected surface structure, the surface structure cannot act as a heat sink. Both the oven and heat cover take up little space and can be assembled and disassembled quickly.

While the invention has been shown in only one of its forms, it should be apparent to those skilled in the art that it is not so limited, but is susceptible to various changes without departing from the scope of the invention.

I claim:

1. An apparatus for molding a curable patch used in repairing an affected contoured surface, the apparatus comprising in combination:

a fluid impermeable outer container having a flexible outer wall;

a fluid impermeable inner container positioned within the outer container, the inner container containing a moldable granular material, the inner container having a base wall and a flexible molding wall opposite the base wall whereon the patch may be placed;

a first vacuum port means attached to the inner container for evacuating the inner container while the molding wall of the inner container is pressed against a contoured surface similar to the affected contoured surface so that the molding wall is drawn against and conforms to the granular material, whereby the granular material is held in a rigid molded form, the molding wall forming a model of the contoured surface so that the patch can be molded to the shape of the model; and a second vacuum port means attached to the outer container for evacuating the outer container so that the outer wall is drawn against the molding wall and patch when the patch is placed on the molding wall to apply pressure to the patch while the patch is curing.

2. The apparatus of claim 1, wherein:

the outer container has a resealable opening through which the patch can be introduced into the outer container.

3. The apparatus of claim 1, wherein:

the outer container is formed from a flexible upper portion and a flexible lower portion, the upper and lower portions being joined together by a resealable seal;

the inner container is positioned within the lower portion of the outer container and attached thereto; and the outer wall is located on the upper portion of the outer container.

4. The apparatus of claim 1, wherein:

the inner container and the outer container are constructed from silicone rubber.

5. The apparatus of claim 1, wherein:

a portion of the flexible outer wall of the outer container is attached to the container by a resealable seal that can be broken to create an opening through which the patch can be introduced into the outer container prior to evacuating the outer container.

6. The apparatus of claim 1, wherein:

the granular material is an aluminum silicate powder.

7. The apparatus of claim 1, further comprising:

breather means which locates between the outer container and the base wall of the inner container for providing a space through which fluid can be drawn from between the inner and outer containers when the outer container is evacuated.

8. The apparatus of claim 1, wherein:

the first vacuum port means is provided by a port located on the inner container, the port having a nozzle to which one end of a flexible vacuum hose is attached, the opposite end of the hose being attached to a vacuum source.

9. The apparatus of claim 1, wherein:

the second vacuum port means includes a port located on the outer container, the port having a nozzle to which one end of a flexible vacuum hose is attached, the opposite end of the hose being attached to a vacuum source.

10. The apparatus of claim 1, wherein:

the first vacuum port means is provided by an inner port located on the inner container, the inner port having an inner nozzle sealingly protruding through the outer container and being connected to a first vacuum hose of a vacuum source; and the second vacuum port means is provided by an outer port located on the outer container, the outer port having an outer nozzle being connected to a second vacuum hose of the vacuum source.

11. The apparatus of claim 1, further comprising:

a flexible heat cover having a perimeter, the cover being joined to the outer wall of the outer container substantially along the perimeter so that a cavity exists between the outer wall and the heat cover; and a heating duct connected to the heat cover for introducing a heated fluid within the cavity between the outer wall and the heat cover for curing the molded patch.

12. An apparatus for molding a curable patch used in repairing an affected contoured surface, the apparatus comprising in combination:

a fluid impermeable outer container having a flexible outer wall, the outer container having a resealable opening through which the patch can be introduced into the outer container;

a flexible, fluid impermeable inner container positioned within the outer container, the inner container containing a moldable granular material, the inner container having a flexible base wall and a flexible molding wall opposite the base wall whereon the patch may be placed;

an inner port located on the inner container, the inner port having an inner nozzle sealingly protruding through the outer container and being connected to a first vacuum hose of a vacuum source for evacuating the inner container while the molding wall of the inner container is pressed against a contoured surface similar to the affected contoured surface so that the molding wall is drawn against and conforms to the granular material, whereby the granular material is held in a rigid molded form, the molding wall forming a model of the contoured surface so that the patch can be molded to the shape of the model;

an outer port located on the outer container, the outer port having an outer nozzle connected to a second vacuum hose of the vacuum source for evacuating the outer container so that the outer wall is drawn against the molding wall and patch when the patch is placed on the molding wall to apply pressure to the patch while the patch is curing; and breather means which locates between the outer container and the base wall of the inner container for providing a space through which fluid can be drawn from between the inner and outer containers when the outer container is evacuated.

13. The apparatus of claim 12, wherein:

the outer container is formed from a flexible upper portion and a flexible lower portion, the upper and lower portions being joined together by a resealable seal;

the base wall of the inner container is positioned within the lower portion of the container and attached thereto; and the outer wall is located on the upper portion of the outer container.

14. The apparatus of claim 12, wherein:

the inner container and outer container are constructed from silicone rubber.

15. The apparatus of claim 12, further comprising:

a flexible heat cover having a perimeter, the cover being joined to the outer wall of the outer container substantially along the perimeter so that a cavity exists between the outer wall and the heat cover; and a heating duct connected to the heat cover for introducing a heated fluid within the cavity between the outer wall and the heat cover for curing the molded patch.

16. An apparatus for molding and curing an uncured composite patch used in repairing an affected contoured surface, the apparatus comprising in combination:

a fluid impermeable outer container having a flexible outer wall;

a flexible, fluid impermeable inner container positioned within the outer container, the inner container containing a moldable granular material, the inner container having a flexible base wall and a flexible molding wall opposite the base wall whereon the composite patch may be placed;

a first vacuum port means attached to the inner container for evacuating the inner container while the molding wall of the inner container is pressed against a contoured surface similar to the affected contoured surface so that the molding wall is drawn against and conforms to the granular material, whereby the granular material is held in a rigid molded form, the molding wall forming a model of the contoured surface so that the patch can be molded to the shape of the model;

a second vacuum port means attached to the outer container for evacuating the outer container so that the outer wall is drawn against the molding wall and patch when the patch is placed on the molding wall to apply pressure to the patch while the patch is curing;

a flexible heat cover having a perimeter, the cover being joined to the outer wall of the outer container substantially along the perimeter so that a cavity exists between the outer wall and the heat cover; and a heating duct connected to the heat cover for introducing a heated fluid within the cavity between the outer wall and the heat cover for curing the molded patch.

17. The apparatus of claim 16, wherein:

the outer container has a resealable opening through which the patch can be introduced into the outer container.

18. The apparatus of claim 16, wherein:

the outer container is formed from a flexible upper portion and a flexible lower portion, the upper and lower portions being joined together by a resealable seal;

the inner container is positioned within the lower portion of the outer container and attached thereto; and the outer wall is located on the upper portion of the outer container.

19. The apparatus of claim 16, wherein:

a portion of the flexible outer wall of the outer container is attached to the container by a resealable seal that can be broken to create an opening through which the patch can be introduced into the outer container prior to evacuating the outer container.

20. The apparatus of claim 19, wherein:

the heat cover is joined to the upper portion of the outer container.

21. The apparatus of claim 16, wherein:

the inner and outer containers are constructed from silicone rubber.

22. The apparatus of claim 16, wherein:

the granular material is an aluminum silicate powder.

23. The apparatus of claim 16, further comprising:

breather means which locates between the outer container and the base wall of the inner container for providing a space through which fluid can be drawn from between the inner and outer containers when the outer container is evacuated.

24. The apparatus of claim 16, wherein:

the first vacuum port means includes a port located on the inner container, the port having a nozzle to which one end of a flexible vacuum hose is attached, the opposite end of the hose being attached to a vacuum source.

25. The apparatus of claim 16, wherein:

the second vacuum port means includes a port located on the outer container, the port having a nozzle to which one end of a flexible vacuum hose is attached, the opposite end of the hose being attached to a vacuum source.

26. The apparatus of claim 16, wherein:

the first vacuum port means is provided by an inner port located on the inner container, the inner port having an inner nozzle sealingly protruding through the outer container, the inner nozzle being connected to a first vacuum hose of a vacuum source; and the second vacuum port means is provided by an outer port located on the outer container, the outer having an outer nozzle connected to a second vacuum hose of the vacuum source.

27. The apparatus of claim 16, further comprising:

an air heater having a blower and a heating element for heating the air from the blower; and wherein the heating duct is connected to the air heater for conducting heated air from the air heater to the heat cover.

28. The apparatus of claim 16, wherein:

the perimeter of the heat cover is integrally formed with the outer wall.

29. The apparatus of claim 16, wherein:

the heat cover is provided with vent means for exhausting the heated air from the cavity blown into the cavity through the heating duct.

30. An apparatus for molding a curable contoured patch used in repairing an affected contoured surface, the patch having a lower layer and at least one upper layer, the lower layer having greater surface dimensions than the upper layer, creating a perimeter with lesser thickness than a central section of the patch, the apparatus comprising in combination:

a fluid impermeable first container having a flexible female molding wall, the first container containing a moldable granular material;

a fluid impermeable second container, the second container having a flexible male molding wall, the second container containing a moldable granular material;

a first vacuum port means attached to the first container for evacuating the first container while the female molding wall is pressed against an unaffected contoured surface that is equivalent to the affected contoured surface, so that the granular material is molded to conform to the unaffected contoured surface and the female molding wall is drawn against and conforms to the molded granular material, holding the female molding wall in a rigid form;

a second vacuum port means attached to the second container for evacuating the second container while the male molding wall is pressed against the female molding wall so that the granular material in the second container is molded to the female molding wall and the male molding wall is drawn against and conforms to the molded granular material in the second container, holding the male molding wall in a rigid form so that the patch can be placed and cured on the male molding wall with the lower layer in contact with the male molding wall; and a fluid impermeable outer container having a flexible outer wall in which the second container can be positioned so that the outer wall is drawn against the male molding wall and patch when the pressure within the outer container is reduced, thereby forcing the patch against the male molding wall so that the patch assumes the shape of the male molding wall while the patch is curing.

31. The apparatus of claim 30, wherein:

the outer container has a resealable opening through which the second container and patch can be introduced into the outer container.

* * * * *